United States Patent
Kamdar et al.

(10) Patent No.: US 7,480,546 B2
(45) Date of Patent: Jan. 20, 2009

(54) SYSTEM AND METHOD FOR PROVIDING LANGUAGE TRANSLATION IN A VEHICLE TELEMATICS DEVICE

(75) Inventors: Hitan S. Kamdar, Utica, MI (US); Russell A. Patenaude, Macomb Township, MI (US); Anthony J. Sumcad, Southfield, MI (US); Shpetim S. Veliu, Livonia, MI (US); Brad T. Reeser, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 767 days.

(21) Appl. No.: 10/843,740

(22) Filed: May 12, 2004

(65) Prior Publication Data

US 2005/0267647 A1 Dec. 1, 2005

(51) Int. Cl.
 *G06F 17/28* (2006.01)
(52) U.S. Cl. ............. 701/1; 704/2; 704/3; 704/E21.19; 707/1
(58) Field of Classification Search ............ 701/1, 701/29; 455/3.02, 4.12, 423; 709/206; 704/2–3, 704/E21.019; 707/1
 See application file for complete search history.

(56) References Cited

U.S. PATENT DOCUMENTS

| | | | | |
|---|---|---|---|---|
| 5,991,723 | A * | 11/1999 | Duffin | 704/260 |
| 6,377,825 | B1 * | 4/2002 | Kennedy et al. | 455/569.2 |
| 6,614,781 | B1 * | 9/2003 | Elliott et al. | 370/352 |
| 6,690,932 | B1 * | 2/2004 | Barnier et al. | 455/414.1 |
| 7,197,502 | B2 * | 3/2007 | Feinsmith | 707/100 |
| 2002/0091633 | A1 * | 7/2002 | Proctor | 705/39 |
| 2004/0022237 | A1 * | 2/2004 | Elliott et al. | 370/356 |
| 2004/0116140 | A1 * | 6/2004 | Babbar et al. | 455/517 |
| 2005/0182773 | A1 * | 8/2005 | Feinsmith | 707/100 |
| 2005/0267647 | A1 * | 12/2005 | Kamdar et al. | 701/1 |
| 2008/0010057 | A1 * | 1/2008 | Chengalvarayan et al. | 704/9 |
| 2008/0013531 | A1 * | 1/2008 | Elliott et al. | 370/356 |
| 2008/0025294 | A1 * | 1/2008 | Elliott et al. | 370/356 |
| 2008/0025295 | A1 * | 1/2008 | Elliott et al. | 370/356 |
| 2008/0205655 | A1 * | 8/2008 | Wilkins et al. | 380/279 |

OTHER PUBLICATIONS

A Field Theoretical Approach to Medical Natural Language Processing; Taira, R.K.; Bashyam, V.; Kangarloo, H.; Information Technology in Biomedicine, IEEE Transactions on; vol. 11, Issue 4, Jul. 2007 pp. 364-375; Digital Object Identifier 10.1109/TITB.2006.884368.*

Fuzzy approach to the intelligent management of virtual spaces; Martinez, J.I.; Skarmeta, A.F.G.; Gimeno, J.B.; Systems, Man, and Cybernetics, Part B, IEEE Transactions on; vol. 36, Issue 3, Jun. 2005 pp. 494-508; Digital Object Identifier 10.1109/TSMCB.2005.862494.*

(Continued)

*Primary Examiner*—Cuong H Nguyen

(57) ABSTRACT

The invention provides a method, a computer usable medium including a program, and a system for providing language translation in a vehicle telematics device. The method includes providing data in a first language format to the vehicle telematics device. The data in the first language format is transmitted from the vehicle telematics device to a call center. The data is translated at the call center from the first language format to a second language format. The data in the second language format is transmitted from the call center to the vehicle telematics device.

9 Claims, 3 Drawing Sheets

OTHER PUBLICATIONS

The NESPOLE! System for multilingual speech communication over the Internet; Lavie, A.; Pianesi, F.; Levin, L.; Audio, Speech, and Language Processing, IEEE Transactions on; vol. 14, Issue 5, Sep. 2006 pp. 1664-1673; Digital Object Identifier 10.1109/TSA.2005.858520.*

Evaluating Ontologies: Towards a Cognitive Measure of Quality; Fang, Jennifer; Evermann, Joerg; EDOC Conference Workshop, 2007. EDOC '07. Eleventh International IEEE; Oct. 15-16, 2007 pp. 109-116; Digital Object Identifier 10.1109/EDOCW.2007.11.*

Visualizing endangered indigenous languages of French Polynesia with Lexus; Cablitz, G.; Ringersma, J.; Kemps-Snijders, M.; Information Visualization, 2007. IV '07. 11th International Conference; Jul. 4-6, 2007 pp. 409-414; Digital Object Identifier 10.1109/IV.2007.134.*

Rule Modeling and Interchange; Giurca, A.; Wagner, G.; Symbolic and Numeric Algorithms for Scientific Computing, 2007. SYNASC. International Symposium on; Sep. 26-29, 2007 pp. 485-491; Digital Object Identifier 10.1109/SYNASC.2007.66.*

A Survey of Automatic Urdu Language Processing; Anwar, W.; Xuan Wang; Xiao-Long Wang; Machine Learning and Cybernetics, 2006 International Conference on; Aug. 2006 pp. 4489-4494; Digital Object Identifier 10.1109/ICMLC.2006.259164.*

Logo—the modular conversational agent understanding Polish; Piasecki, M.; Matysiak, I.; Rusak, A.; Intelligent Systems Design and Applications, 2005. ISDA '05. Proceedings. 5th International Conference on; Sep. 8-10, 2005 pp. 178-183 Digital Object Identifier 10.1109/ISDA.2005.60.*

* cited by examiner

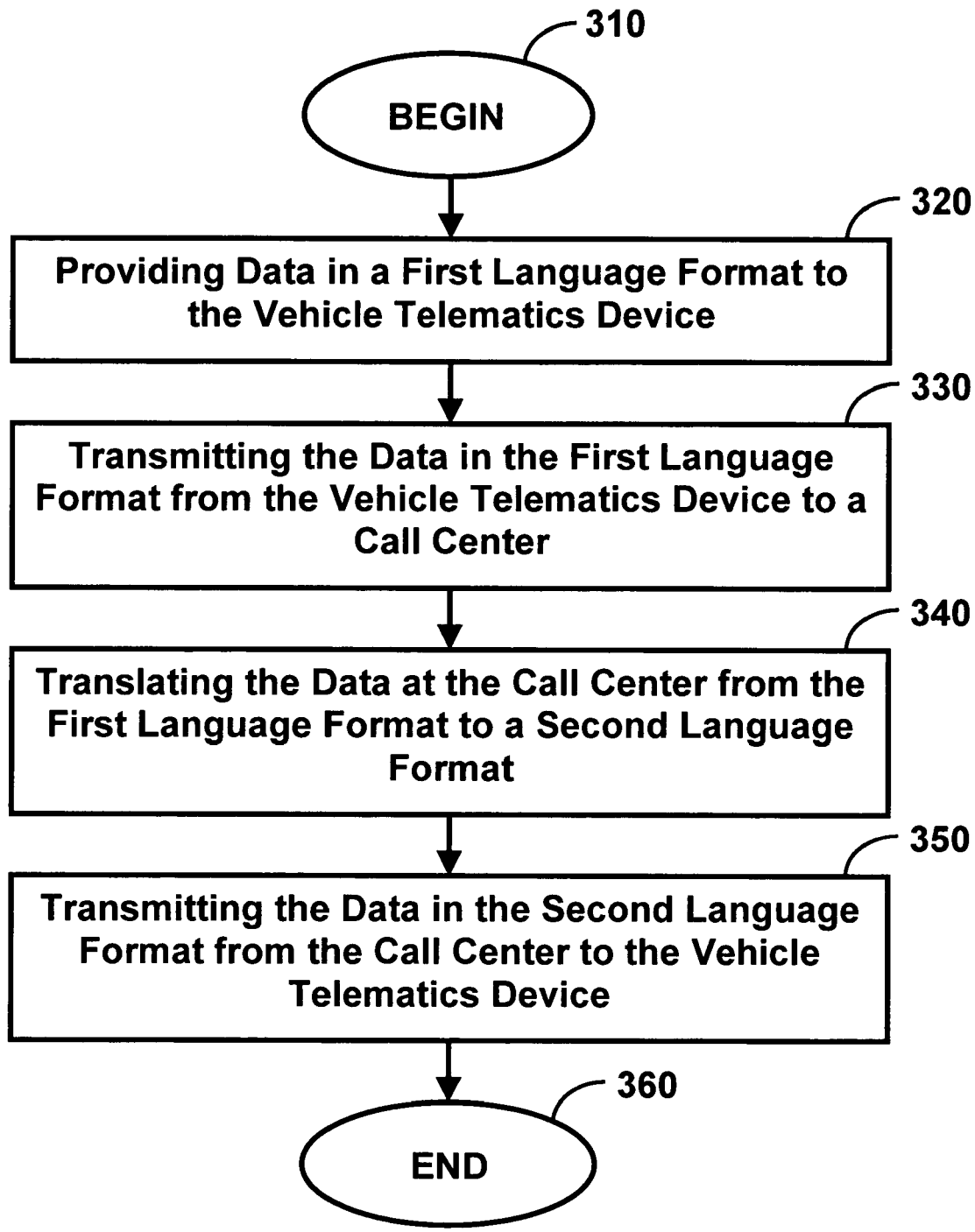

SYSTEM AND METHOD FOR PROVIDING LANGUAGE TRANSLATION IN A VEHICLE TELEMATICS DEVICE

FIELD OF THE INVENTION

This invention relates generally to a vehicle telematics device. More specifically, the invention relates to a strategy for providing language translation in a vehicle telematics device.

BACKGROUND OF THE INVENTION

One of the fastest growing areas of communications technology is related to automobile network solutions. The demand and potential for wireless vehicle communication, networking, and diagnostics services have recently increased. Although many vehicles on the road today have systems with limited wireless communication functions such as unlocking a door and setting or disabling a car alarm, new vehicles offer communication systems that help personalize comfort settings, run maintenance and diagnostic functions, place telephone calls, access call center information, update controller systems, determine vehicle location, assist in tracking vehicle after a theft of the vehicle, and provide other vehicle related services. Vehicle users can contact call centers and receive navigational, concierge, emergency, and location services, as well as other specialized help such as locating the geographical location of a stolen vehicle and honking the horn of a vehicle when the owner cannot locate it in a large parking garage. Such vehicle control and communications features can be orchestrated by a vehicle telematics device, which is operably connected to various vehicle systems and to a call center through a wireless network.

Controllers and software play a large role in the automation of an increasing number of vehicle functions. With the constant evolution of technologies, upgrades are frequently made to vehicle software modules to provide additional vehicle features, for example support for different languages or to improve the performance of existing vehicle functions. The installation of upgraded software modules can be handled manually by vehicle technicians at a vehicle dealership. The manual installation of vehicle-specific software requires costly vehicle technician time and can be time consuming. Often times, there are long time gaps between visits to a vehicle dealership. As a result, the vehicle is not available for a vehicle technician to manually upgrade the vehicle software modules, thereby depriving the vehicle owner of software upgrades and improved functionality.

To facilitate interaction between the vehicle user and the telematics device, it is desirable to communicate in the user's native language. It is often impractical, however, for a vehicle to include software modules for supporting more than a couple of languages. For example, the storage and execution of several language modules typically requires a large amount of memory and processing power. Further, it may require the aforementioned time-consuming software upgrades should additional language functionalities become available.

Accordingly, it would be desirable to provide multi-language support for a vehicle telematics device that does not require large amounts of memory and processing power and would allow relatively fast incorporation of additional language functionalities. It is desirable, therefore, to provide a system and method for providing language translation in a vehicle telematics device that would overcome the aforementioned and other disadvantages.

SUMMARY OF THE INVENTION

A first aspect of the present invention provides a method of providing language translation via a vehicle telematics device. The method includes providing data in a first language format to the vehicle telematics device. The data in the first language format is transmitted from the vehicle telematics device to a call center. The data is translated at the call center from the first language format to a second language format. The data in the second language format is transmitted from the call center to the vehicle telematics device.

A second aspect of the invention provides a computer usable medium including a program for providing language translation via a vehicle telematics device. The computer usable medium includes computer readable program code for providing data in a first language format to the vehicle telematics device, transmitting the data in the first language format from the vehicle telematics device to a call center, replacing at the call center the data in the first language format with equivalent data in a second language format, and transmitting the equivalent data in the second language format from the call center to the vehicle telematics device.

A third aspect of the invention provides a system for providing language translation via a vehicle telematics device. The system includes means for providing data in a first language format to the vehicle telematics device, means for transmitting the data in the first language format from the vehicle telematics device to a call center, means for translating the data at the call center from the first language format to a second language format, and means for transmitting the data in the second language format from the call center to the vehicle telematics device.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 3 is a flow diagram of a method of providing language translation in a vehicle telematics device, in accordance with one embodiment of the present invention.

DETAILED DESCRIPTION OF THE DRAWINGS

Figure 1:
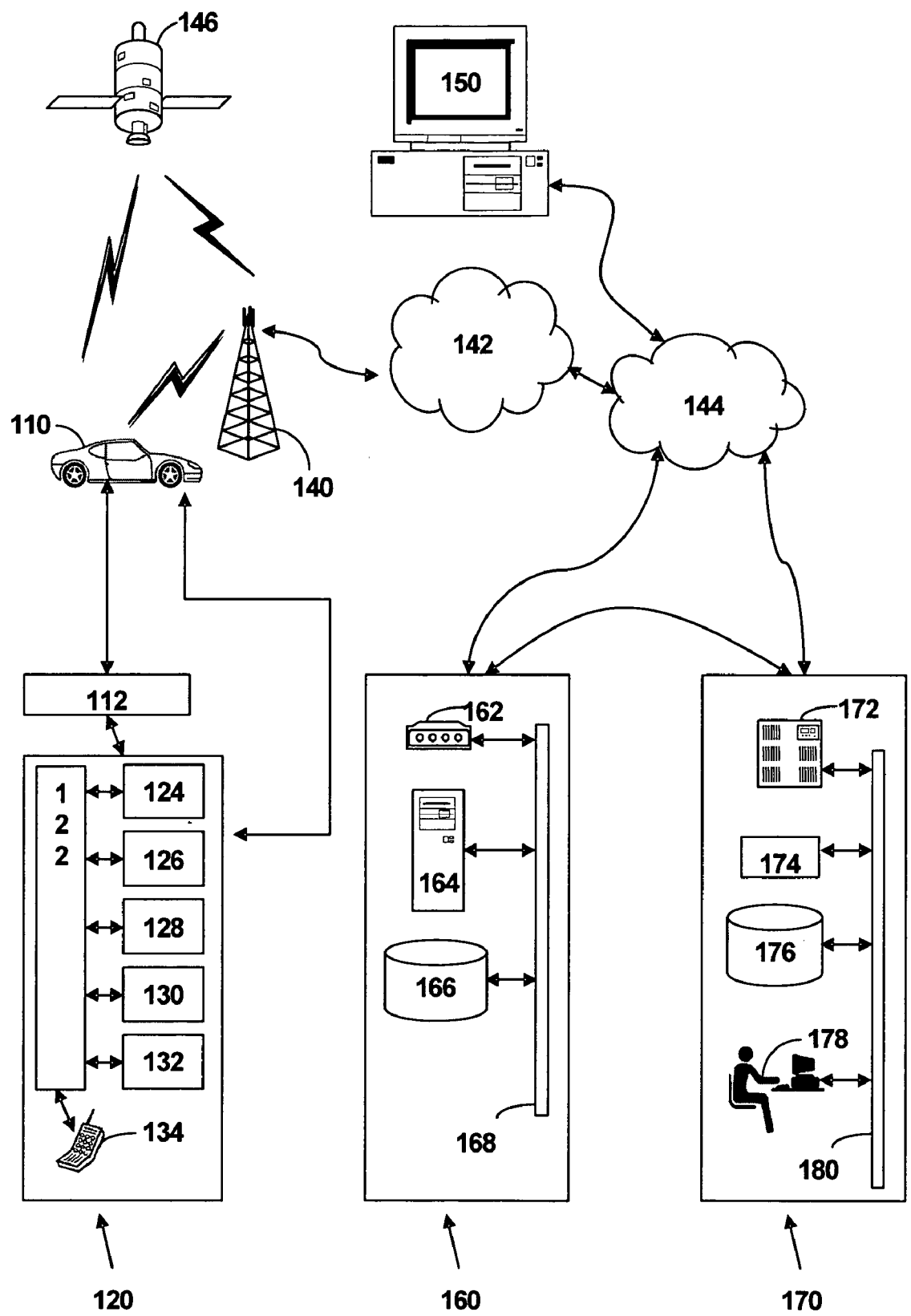
FIG. 1 is a schematic diagram of a mobile vehicle communication system in accordance with one embodiment of the present invention.

FIG. 1 is a schematic diagram of a mobile vehicle communication system in accordance with one embodiment of the present invention and shown generally by numeral 100. Mobile vehicle communication system (MVCS) 100 includes a mobile vehicle communication unit (MVCU) 110; a vehicle communication network 112; a telematics unit 120; one or more wireless carrier systems 140; one or more communication networks 142; one or more land networks 144; one or more satellite broadcast systems 146; one or more client, personal, or user computers 150; one or more web-hosting portals 160; and one or more call centers 170. In one embodiment, MVCU 110 is implemented as a mobile vehicle equipped with suitable hardware and software for transmitting and receiving voice and data communications. MVCS 100 can include additional components not relevant to the present discussion. Mobile vehicle communication systems and telematics units are known in the art.

MVCU 110 is also referred to as a mobile vehicle in the discussion below. In operation, MVCU 110 can be implemented as a motor vehicle, a marine vehicle, or as an aircraft. MVCU 110 can include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 can be implemented without one or more of the above listed components, such as, for example, speakers 132. Telematics unit 120 can include additional components not relevant to the present discussion.

In one embodiment, DSP 122 is implemented as a microcontroller, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

DSP 122 executes various computer programs that control programming and operational modes of electronic and mechanical systems within MVCU 110. DSP 122 controls communications (e.g., call signals) between telematics unit 120, wireless carrier system 140, and call center 170. Additionally, DSP 122 controls reception of communications from satellite broadcast system 146. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from DSP 122 are translated into voice messages and sent out through speaker 132.

Wireless carrier system 140 is a wireless communications carrier or a mobile telephone system and transmits to and receives signals from one or more MVCUs 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 broadcasts over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, data packets received by telematics unit 120 are implemented by DSP 122. In another example, data packets received by telematics unit 120 are communicated (see FIG. 2 and discussion, below) to modified MVCUs within the MVCS.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more land-line telephones. Communication network 142 and land network 144 connect wireless carrier system 140 to web-hosting portal 160 and call center 170.

Client, personal, or user computer 150 includes a computer usable medium to execute Internet-browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data include directives to change certain programming and operational modes of electronic and mechanical systems within MVCU 110.

In operation, a client utilizes computer 150 to initiate setting or re-setting of user-preferences for MVCU 110. In an example, a client utilizes computer 150 to provide radio station presets as user-preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web servers 164, one or more databases 166, and a network system 168. Web-hosting portal 160 is connected directly by wire to call center 170 or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 transmits digital data to and from modem 162, data that are then transferred to web server 164. Modem 162 can reside inside web server 164. Land network 144 transmits data communications between web-hosting portal 160 and call center 170.

Web server 164 receives user-preference data from client computer 150 via land network 144. In alternative embodiments, computer 150 includes a wireless modem to send data to web-hosting portal 160 through a wireless communication network 142 and a land network 144. Data are received by land network 144 and sent to one or more web servers 164. In one embodiment, web server 164 is implemented as any suitable hardware and software capable of providing web services to help change and transmit personal-preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 provides requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
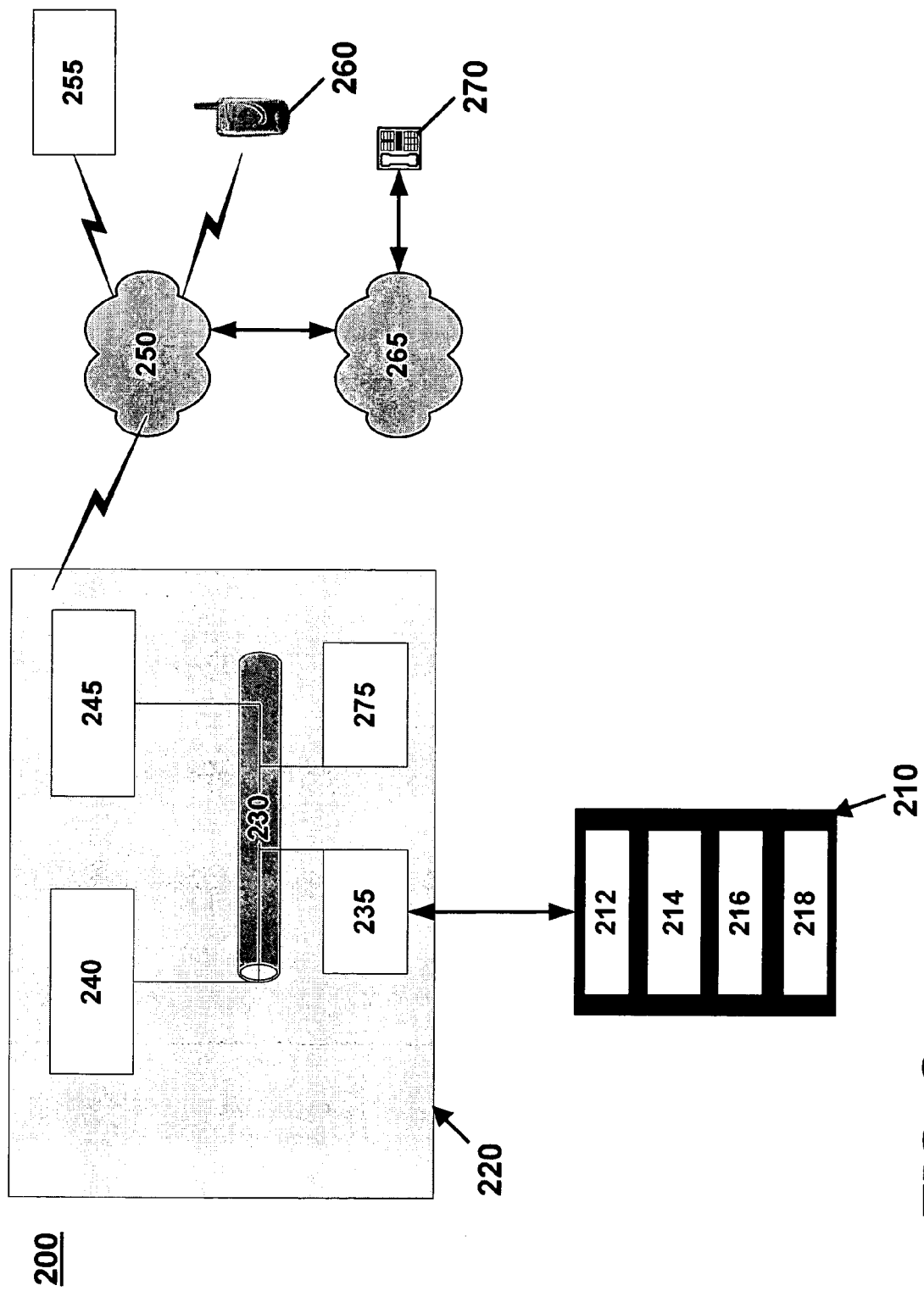
FIG. 2 is a schematic diagram of a system for providing language translation in a vehicle telematics device, in accordance with one embodiment of the present invention.

FIG. 2 is a schematic diagram of a system 200 for providing language translation in a vehicle telematics device 220, in accordance with one embodiment of the present invention. System 200 includes an input/output (I/O) device 210 linked to the telematics device 220. I/O device 210 ise a device for receiving input (e.g., manual input, audio input, etc.) and providing output (e.g., output display, audio output, etc.) to the vehicle user. In one embodiment, the I/O device 210 includes an LCD display 212 and a speaker 214 for providing output, and a display softkey 216 and microphone 218 for receiving input. The inventors contemplate that numerous I/O devices can be adapted for use with the present invention and that the examples provided herein do not limit the scope of the present invention.

I/O device 210 is linked to a vehicle data network 230 through a network interface 235. Data network 230 is further linked to a vehicle controller unit 240 and a vehicle communications processor 245 using a network interface as previously described. Controller unit 240 performs pre-defined functions such as unlocking and, optionally, opening doors/trunk/windows; setting personal comfort settings; adjusting electronic and mechanical devices such as seats, mirrors, radio, onboard computer, etc. Communications processor 245 performs general communication functions (e.g., placing calls, GPS or mapping functions, communicating with a call center, etc.). Specifically, the communications processor 245 links to a wireless network 250 such as a code division multiple access (CDMA) network, a global system for mobile communications (GSM) network, and the like. The wireless network 250 in turn provides access to a call center 255, cellular communications devices 260, and the like. Wireless network 250 provides access to a public switched telephone networks (PSTN) 265 or to a telephony system 270. Call center 255 provides language translation, as described below, and other functions, as described above. Telematics device 220 includes a memory portion 275 (e.g., flash memory, RAM, EEPROM, etc.) for storing data.

FIG. 3 is a flow diagram of a method of providing language translation in a vehicle telematics device, in accordance with one embodiment of the present invention. In FIG. 3, method 300 utilizes one or more systems and concepts detailed in FIGS. 1 and 2 and their corresponding descriptions above. The present invention also takes the form of a computer usable medium including a program for configuring an electronic module within a vehicle. The program stored in the computer usable medium includes computer program code for executing the method steps described in FIG. 3.

In FIG. 3, the method 300 begins at step 310.

At step 320, data is provided in a first language format (e.g., English) to the telematics device. In one embodiment, the data in the first language format comprises data from the vehicle data network. For example, the telematics hardware can be programmed to intercept specific data from the vehicle data network including vehicle data upload data, diagnostic trouble codes, vehicle alerts, vehicle messages, radio broadcast alert messages, email messages, virtual advisor information, phone numbers, voicemail messages, vehicle prompts, display data, message data, and the like. The inventors contemplate that the data will comprise various types of information provided by the vehicle and/or user to be translated and are not limited to the examples provided herein.

Numerous strategies are known for monitoring a vehicle data network for various alerts, messages, data, prompts, trouble codes, and the like. Such strategies can be adapted by one skilled in the art for use with the present invention. For example, U.S. Pat. No. 6,330,499 to Chou et al. issued on Dec. 11, 2001, discloses a system and method for vehicle diagnostics and health monitoring. The '499 patent discloses an information system for a vehicle including an electronic data collector (preferably for obtaining electronic data from a vehicle's internal monitoring system), a client computer device within the vehicle (preferably for data management, remote session management, and user interaction), a communication unit (preferably coupled to the client computer device, for providing remote communication for the client computer device), a remote service center (including a vehicle data store, a server computer, and a call center for communicating with the client computer device via the communication unit). Information can be reliably extracted from the vehicle's internal monitoring systems, and the information can be transferred to the remote service center.

In another or the same embodiment, the vehicle user selects the portion of the data in the first language format to be translated into a second language. For example, the user may wish to have only vehicle alert and email message data translated into the second language. Alternatively, the user may wish to have all appropriate data of the vehicle data network translated. This selection can be made with, for example, a softkey menu provided in the I/O device, with a voice command, or through a web portal (e.g., by providing various information such as a vehicle identification number, username/password, etc.). The user can further select the second language (e.g., Japanese), which is presumably his or her native language, in a like manner.

In another or the same embodiment, the user places a service request to the call center based on an input that is placed into the I/O device, for example, or placed by the vehicle itself. Specifically, the input can be sent from the I/O device to the vehicle telematics device and, further, to the call center as described above for placing the service request. The user can request a subscription modification (e.g., a change in the number of minutes or in other features associated with the telematics device or input device), map information (for download onto the telematics device or input device), direction information (for download onto the telematics device or input device), call placement (including access to voice mail/messaging services and text messaging), non-emergency assistance, emergency assistance, various vehicle functions such as performing a pre-defined function (e.g., unlocking and, optionally, opening doors/trunk/windows; setting personal comfort settings; adjusting electronic and mechanical devices such as seats, mirrors, radio, onboard computer, etc.), a communication function (e.g., placing calls, modifying GPS or mapping functions, etc.), or other information or services. The inventors contemplate numerous requests will be placed to the call center via the input device. The requests are not limited to the examples provided herein.

At step 330, the data in the first language format are transmitted from the telematics device to a call center. The data can be transmitted to the call center by the communications processor of the telematics device via the wireless network as understood in the art.

At step 340, the data are translated at the call center from the first language format to a second language format. Numerous strategies are known for translating data in a first language to a second language, and such strategies can be adapted by one skilled in the art for use with the present invention.

For example, U.S. Pat. No. 5,765,131 to Stentiford et al. issued on Jun. 9, 1998, discloses a language translation system and method. The '131 patent discloses a language translation system for translating phrases from a first language into a second language comprising a store holding a collection of phrases in the second language. Phrases input in the first language are each characterized on the basis of one or more keywords, and the corresponding phrase in the second language is output. This phrasebook approach enables what is effectively rapid and accurate translation, even from speech. Since the phrases in the second language are prepared in advance and held in store, there need be no problems of poor translation or ungrammatical construction. The output can be in text, or, using speech synthesis, in voiced form. With appropriate choice of keywords, it is possible to characterize a large number of relatively long and complex phrases with just a few keywords.

As another example, U.S. Pat. No. 6,690,932 to Barnier et al. issued on Feb. 10, 2004, discloses a system and method for providing language translation services in a telecommunication network. The '932 patent discloses a strategy for providing language translation services among a call taker at a call receiving station speaking a first language, a caller placing a request call from a call origin speaking a second language, and a translation service. The translation service comprises the following: (a) a call distribution facility at the receiving station that transfers the call to a second-language call taker at the receiving station according to distribution rules; and (b) an information store coupled with the receiving station that contains information relating to selected call origins. The distribution rules are applied according to information received from the information store. The system can further comprise the following: (c) a translation agency remote from the receiving station that includes a second-language-proficient translator; and (d) a call-initiating facility at the receiving station for contacting the translation agency in selected circumstances. The call-initiating facility provides predetermined identification data required by the translation agency substantially immediately upon effecting the contact. The method comprises the steps of (a) providing a call distribution facility that transfers request calls to a second-language call taker at the receiving station according to distribution rules, (b) providing an information store with information relating to selected call origins (the predetermined distribution rules are applied according to information received from the information store), (c) providing a translation agency remote from the receiving station that includes second-language-proficient translators, and (d) providing a call-initiating facility at the receiving station for contacting the translation agency in selected circumstances.

At step 350, the data in the second language format are transmitted from the call center to the telematics device. In one embodiment, the data in the second language format are received by the telematics device and subsequently stored in its memory portion. At a later time, should a like data translation be required, the data in the second language can be accessed from the memory portion instead of requiring another translation. To conserve space, the memory portion can be purged when necessary (e.g., if the user relinquishes the vehicle to another party, thereby no longer requiring the stored data in the second language).

In another or the same embodiment, the transmitted data in the second language are communicated. For example, the data in the second language can be communicated to the vehicle user by a visual display (e.g., an icon, symbol, text, etc. displayed via the I/O display), an audio signal (e.g., a chime or other sound played via the I/O speaker), and/or speech synthesis (e.g., a data phrase played via the I/O speaker using a speech synthesis algorithm known in the art). Those skilled in the art will recognize that numerous strategies can be adapted for communicating the transmitted data in the second language to the vehicle user in accordance with the present invention.

At step 360, the method terminates.

The above-described systems and methods for providing language translation in a vehicle telematics device are exemplary implementations. The actual implementation can vary from the strategies described and illustrated herein. Moreover, various other improvements and modifications to this invention may occur to those skilled in the art, and those improvements and modifications fall within the scope of this invention as set forth in the claims below.

The present invention can be embodied in other specific forms without departing from its spirit or essential characteristics. The described embodiments are to be considered in all respects only as illustrative and not restrictive.

The invention claimed is:

1. A method of providing language translation of prepared verbal data for a vehicle user via a vehicle telematics device, the method comprising:
   providing prepared verbal data in a first human language to the vehicle telematics device of the vehicle user;
   transmitting a portion of the prepared verbal data in the first human language from the vehicle telematics device to a call center, the portion of the prepared verbal data being selected by the vehicle user;
   replacing at the call center the portion of the prepared verbal data in the first human language with an equivalent portion of prepared verbal data in a second human language, the second human language being selected by the vehicle user; and
   transmitting the equivalent prepared verbal data in the second human language from the call center back to the vehicle telematics device of the vehicle user.

2. The method of claim 1 wherein the data in the first human language comprises data from a vehicle data network.

3. The method of claim 1 wherein the data are selected from a group consisting of: vehicle data upload data, a diagnostic trouble code, a vehicle alert, a vehicle message, a radio broadcast alert message, an email message, virtual advisor information, a phone number, a voicemail message, a vehicle prompt, display data, message data, and a combination thereof.

4. The method of claim 1 further comprising storing the data in the second human language for access by the vehicle telematics device.

5. The method of claim 1 further comprising selecting the second human language.

6. The method of claim 1 further comprising placing a service request to the call center based on an input.

7. The method of claim 6 wherein the service request is selected from a group consisting of: a subscription modification, map information, direction information, a call placement, non-emergency assistance, emergency assistance, a pre-defined function, a communications function, and a combination thereof.

8. The method of claim 1 further comprising communicating the transmitted data in the second human language.

9. The method of claim 8 wherein the transmitted data in the second human language are communicated by at least one of a visual display, an audio signal, and a speech synthesis.

* * * * *